United States Patent [19]

Satoh

[11] Patent Number: 4,641,357
[45] Date of Patent: Feb. 3, 1987

[54] METHOD FOR READING A DOCUMENT IMAGE

[75] Inventor: Junichi Satoh, Chigasaki, Japan

[73] Assignee: International Business Machines Corp., Armonk, N.Y.

[21] Appl. No.: 710,776

[22] Filed: Mar. 11, 1985

[51] Int. Cl.[4] .............................................. G06K 9/18
[52] U.S. Cl. ...................................... 382/61; 235/436; 235/474; 250/561; 358/285; 382/65
[58] Field of Search ............................ 382/65, 67, 61; 358/285, 288; 250/561, 570; 235/436, 474, 494, 495

[56] References Cited

U.S. PATENT DOCUMENTS

| | | | |
|---|---|---|---|
| 2,406,299 | 8/1946 | Koulicovitch | 250/561 |
| 3,264,469 | 8/1966 | Rabinow | 382/67 |
| 4,256,959 | 3/1981 | Monette | 358/285 |
| 4,298,859 | 11/1981 | Feilchenfeld | 235/474 |
| 4,559,644 | 12/1985 | Kataoka et al. | 235/470 |

FOREIGN PATENT DOCUMENTS 0101520 2/1984 Japan .

OTHER PUBLICATIONS

Matsushita, Subscanning Control System, 10/8/82 Abstract.

Primary Examiner—Leo H. Boudreau
Assistant Examiner—Amelia A. Skinner
Attorney, Agent, or Firm—Robert Lieber

[57] ABSTRACT

A method and associated apparatus are disclosed for scanning documents and producing electronically stored signals corresponding to images on the documents. A stripe pattern of lines obliquely inclined relative to the direction of document movement provides precise indications of "pel" increments of document displacement relative to the image sensing apparatus. Using these indications, the system is effectively rendered insensitive to interruptions of document motion and/or variations in document motion speed. For example, this enables a system having limit buffer storage capacity to capture a full document image; by intermittently scanning portions of the image which fill the store, and halting document motion between scans of successive portions to allow for processing of the partial image data between the buffer store and other parts of the system's memory.

11 Claims, 11 Drawing Figures

(DP) = DETECTION POSITION
(SD) = STRIPE DETECT

METHOD FOR READING A DOCUMENT IMAGE

FIELD OF THE INVENTION

The invention relates to a method and apparatus for scanning images on documents via a solid state scan/read device which scans the image in a main scan direction and a carriage system which provides relative motion between the document and scan device in a sub-scan direction.

PRIOR ART

In order to scan document images with a resolution of 8 PEL/mm in a main scan direction and 8 PEL line/mm in a perpendicular sub-scan direction, large buffer memory capacity on the order of 512K bytes would be required for storing a full page image of an A4 size document. For reducing cost, it is desirable to use a smaller buffer memory, such as 128K bytes, 256K bytes, etc. For accommodating such smaller memory, it is known to conduct the scan operation in an intermittent manner. When, for example, a 256K byte memory is used, the scan operation is stopped momentarily after the upper half of the document has been scanned, and restarted for scanning the lower half of the document when the data of the upper half is transferred from the memory to a next processing station.

To preserve quality of the scanned image, it is necessary to have continuity between the image of the last PEL line in the upper half and the first PEL line in the lower half. But, precise control for keeping such continuity has not heretofore been realized without considerable expense; particularly in systems in which a big mass object such as a flat bed scanner is moved. To keep such continuity, unexamined published patent application No. 57-129067 proposes a backward feed of the scan unit from the last PEL line of a partial area of a document to a predetermined position, and a re-start of the scan unit from the predetermined position to scan a next partial area when the memory becomes available. During the travel across the distance between the predetermined position and the last PEL line of the first area, the scan operation is suppressed and the scan unit is accelerated to the desired scan speed to scan the second area. When the scan unit reaches the first PEL line of the second area of the document, the scan operation is started to capture the image of the second area.

PROBLEMS SOLVED BY THE INVENTION

As described above, an additional reciprocal movement of the scan unit has been required to precisely capture the images of the last PEL line of the first partial image area on the document and the first PEL line of the second partial image area on the document with virtual continuity between the first and second partial images. The present invention realizes precise and virtually continuous capture of such partial images, without requiring additional reciprocal movement and without the expense associated with such movement.

SUMMARY OF THE INVENTION

Briefly stated, this invention provides a method and associated apparatus for scanning or reading document images—via a solid state scan/read device for scanning the image in the main scan direction and a carriage assembly for creating relative motion in a sub scan direction between the document and scan device—featuring use of a stripe pattern inclined at a predetermined oblique angle relative to the main scan direction. The stripe pattern is moved relative to the solid state scan/read device, in synchronism with the relative motion between the document. Movement of the stripe pattern in the main scan direction is detected by the solid state scan/read device, and the coupling of image data into buffer storage is controlled in response to detected stripe movements, whereby all stored representations of successive image PEL lines have uniform image continuity.

DETAILED DESCRIPTION

Figure 1:
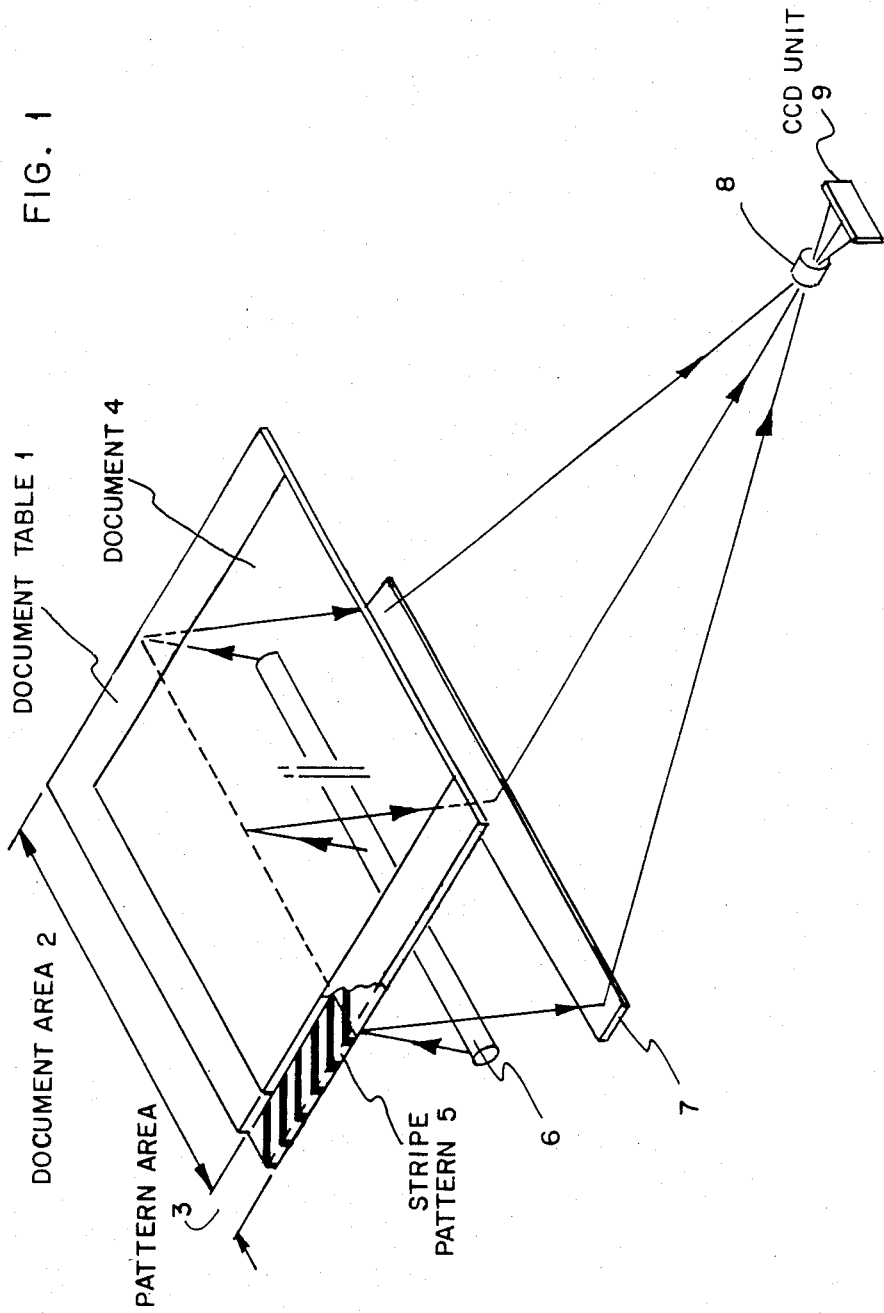
FIG. 1 shows one embodiment of the invention in which a stripe pattern in accordance with the invention is provided along one edge of a movable flat table which holds documents to be scanned.

Referring to FIG. 1, document table 1, movable reciprocally with respect to a fixed scan system, has a document area 2 overlying a glass platen, and a stripe pattern area 3. A document 4 to be scanned is placed on the document area 2 with its image facing down onto the glass platen. A pattern of obliquely inclined stripe marks 5 having a predetermined form is printed in area 3 on the lower surface of table 1. The fixed scan system includes a lamp 6, a mirror 7, a lens 8 and CCD unit 9. Light from lamp 6 illuminates linear portions of stripe pattern 5 and document 4, and reflects on mirror 7 to lens 8 which focuses the reflected light onto CCD unit 9.

Figure 2:
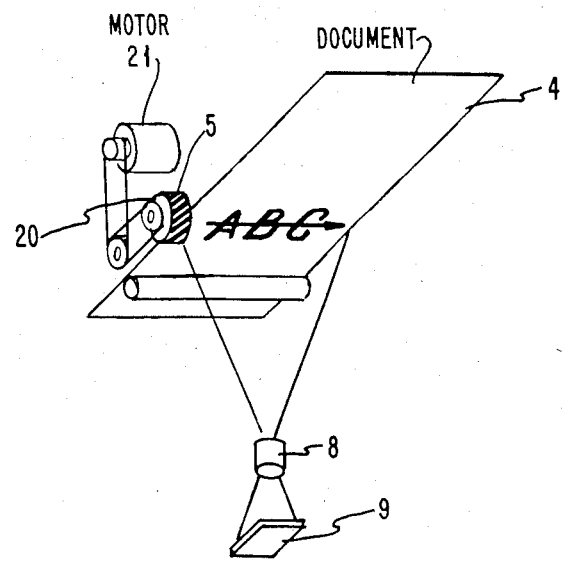
FIG. 2 shows another embodiment of the invention in which a stripe pattern in accordance with the invention is provided on a feed roll which moves documents relative to the scanning system.

FIG. 2 shows a document feed through type scanner device in which the inclined stripe pattern 5 is provided on the outer periphery of a roller 20 which moves in synchronism with a document feed roll. Roller 20, driven by electric motor 21, moves so that the stripe pattern 5 and document 4 are scanned in synchronism by unit 9.

Figure 3:
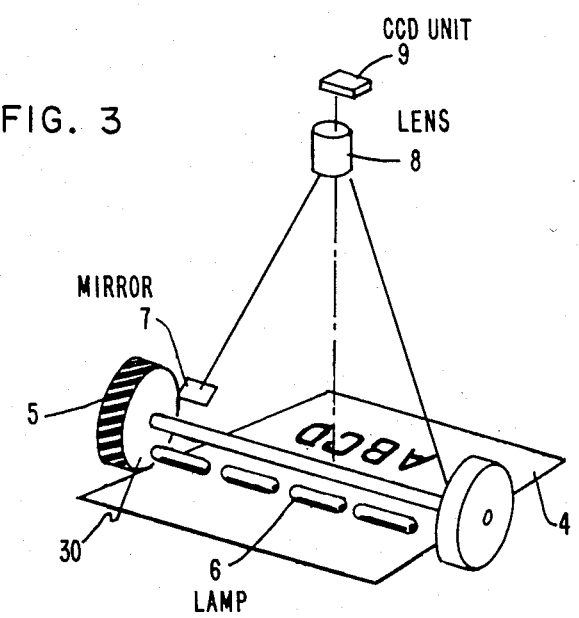
FIG. 3 shows a third embodiment in which the stripe pattern is provided on a roller which moves the scanning apparatus relative to a stationary document.

Referring to FIG. 3, a manually movable type scanner is shown in which lamp 6, mirror 7, lens 8 and CCD unit 9 are assembled in a structure resembling a lawn mower. The stripe pattern 5 is provided on the periphery of roller 30 on which this structure rides.

Figure 4:
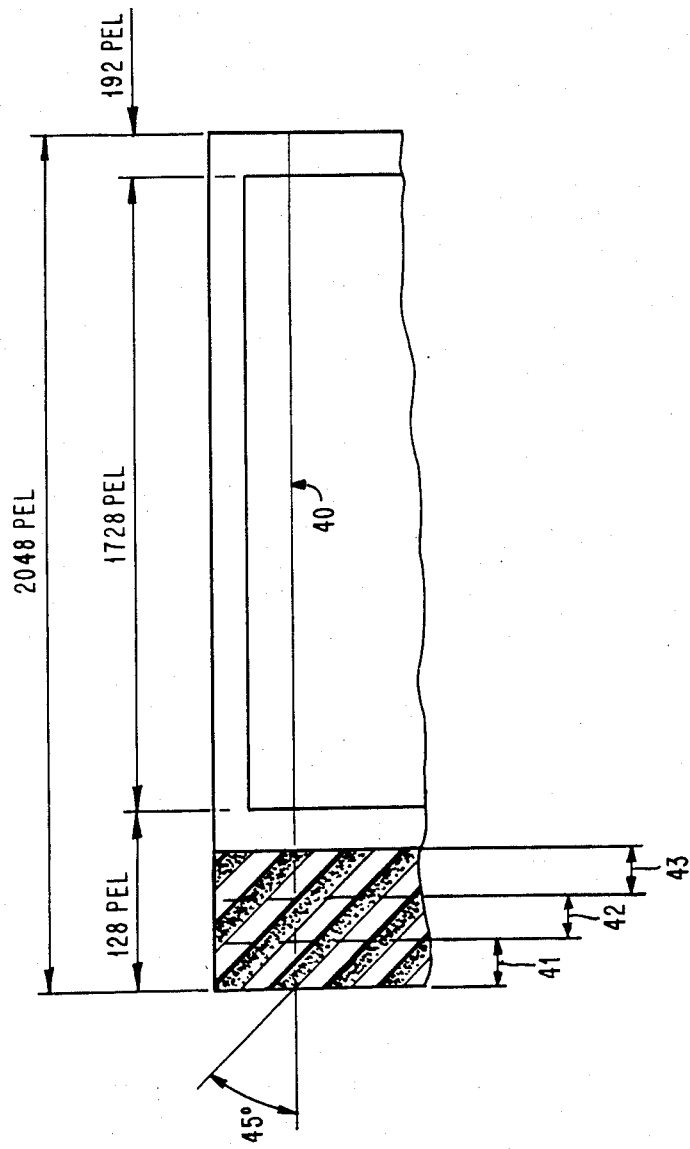
FIG. 4 shows a plan view of a portion of the document table of FIG. 1 with the above-mentioned edge stripe pattern.

FIG. 4 is a view of a portion of document table 1 in FIG. 1 as viewed from its underside. CCD unit 9 has 2048 small CCD elements arrayed in a line. Of these CCD elements, 128 are positioned to sense light reflected from the pattern area 3 on the document table 1, 1728 CCD elements are positioned to sense light from a letter size document 216 mm wide, and the remaining 192 CCD elements sense the right margin area on the document table. Stripe pattern 5 is inclined 45 degrees with respect to the main scan direction 40; i.e. relative to the direction of alignment of the 2048 CCD elements of the CCD unit 9.

Figure 5:
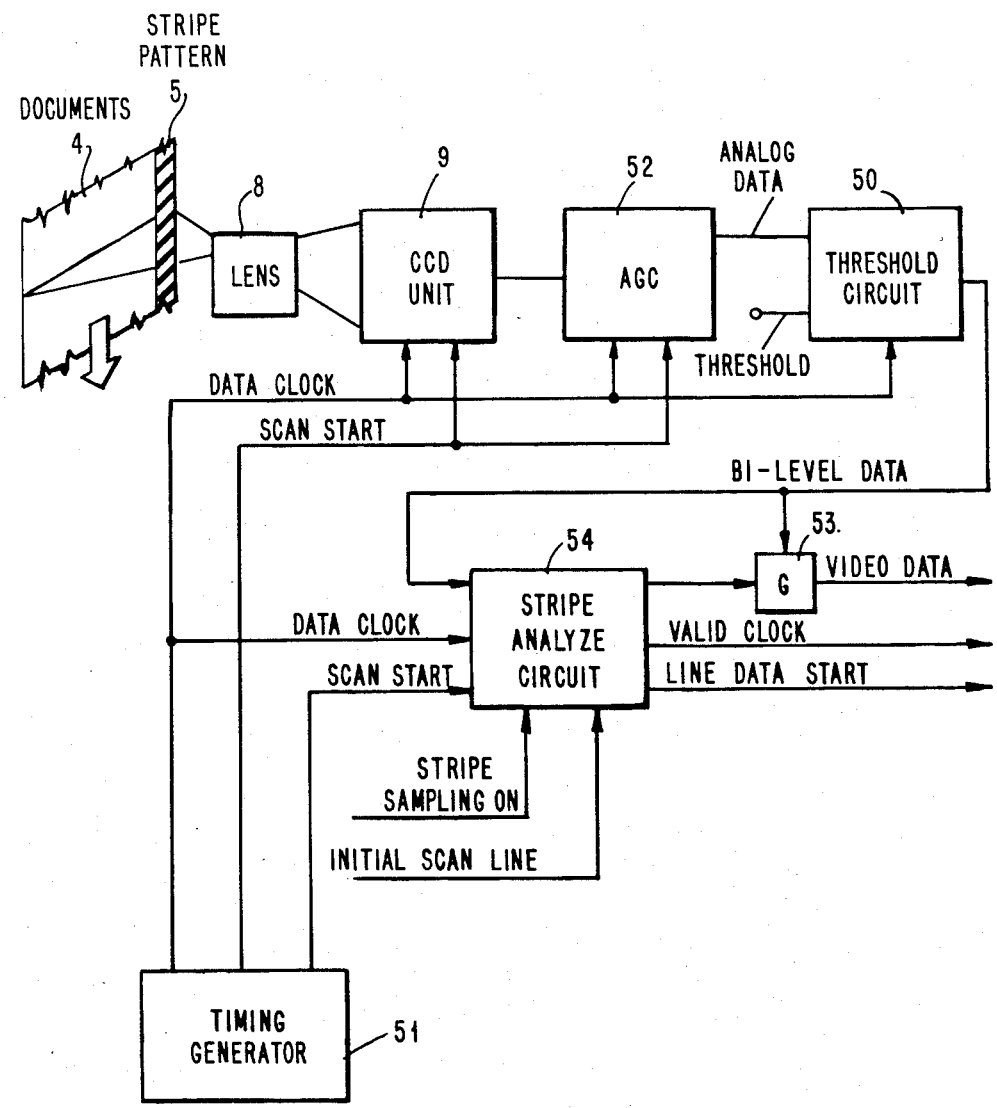
FIG. 5 shows a general block diagram of an image scan system into which the invention is incorporated.

FIG. 5 shows a block diagram of the image scan system into which the present invention is incorporated. Pulses are active in a negative logic. The light reflected from the image on document 4, through the glass platen, and from the 45 degree inclined stripe pattern is projected onto the elements of CCD unit 9 through lens 8. Timing generator 51 generates data clock pulses and scan start signals. The data clock pulses are applied to CCD unit 9 for controlling sequential analog data sampling operations from #0 CCD element to #2047 CCD element. AGC (Automatic Gain Control) circuit 52 receives the sequential analog data signals from CCD unit 9. The amplified analog data signals are sequentially transferred from circuit 52 to a threshold circuit 50. Threshold circuit 50 includes a compare circuit having one input terminal receiving the analog data signals and another input terminal coupled to a reference threshold level. If the analog data signal exceeds the threshold level, the threshold circuit 50 produces "white" signal "0" on its output, and if the analog data signal is smaller than the threshold level, the threshold circuit 50 produces "black" signal "1" on its output; whereby the analog data signals of #0 through #2047 CCD elements (i.e. #0 PEL through #2047 PEL) are converted into bi-level digital data functions (i.e. "1" and "0" values).

Figure 6A:
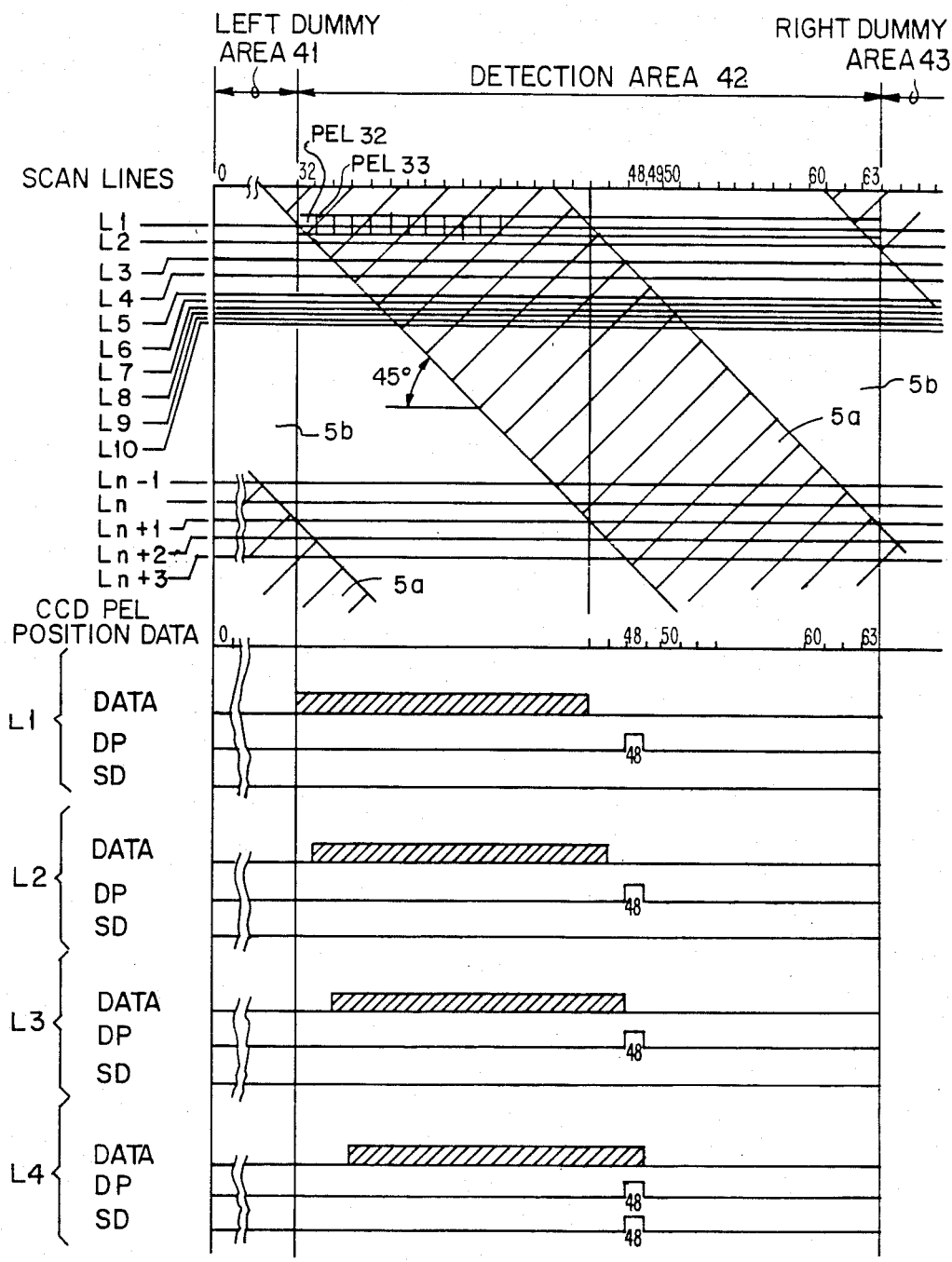
FIGS. 6A and 6B schematically illustrate the relationship between movements of the stripe pattern in the main scan direction of the document and signal outputs from the CCD (Charge Coupled Device) scan unit for explaining the principle of the present invention for precisely tracking the relative movement at variable speed between document and the CCD unit.
Figure 6B:
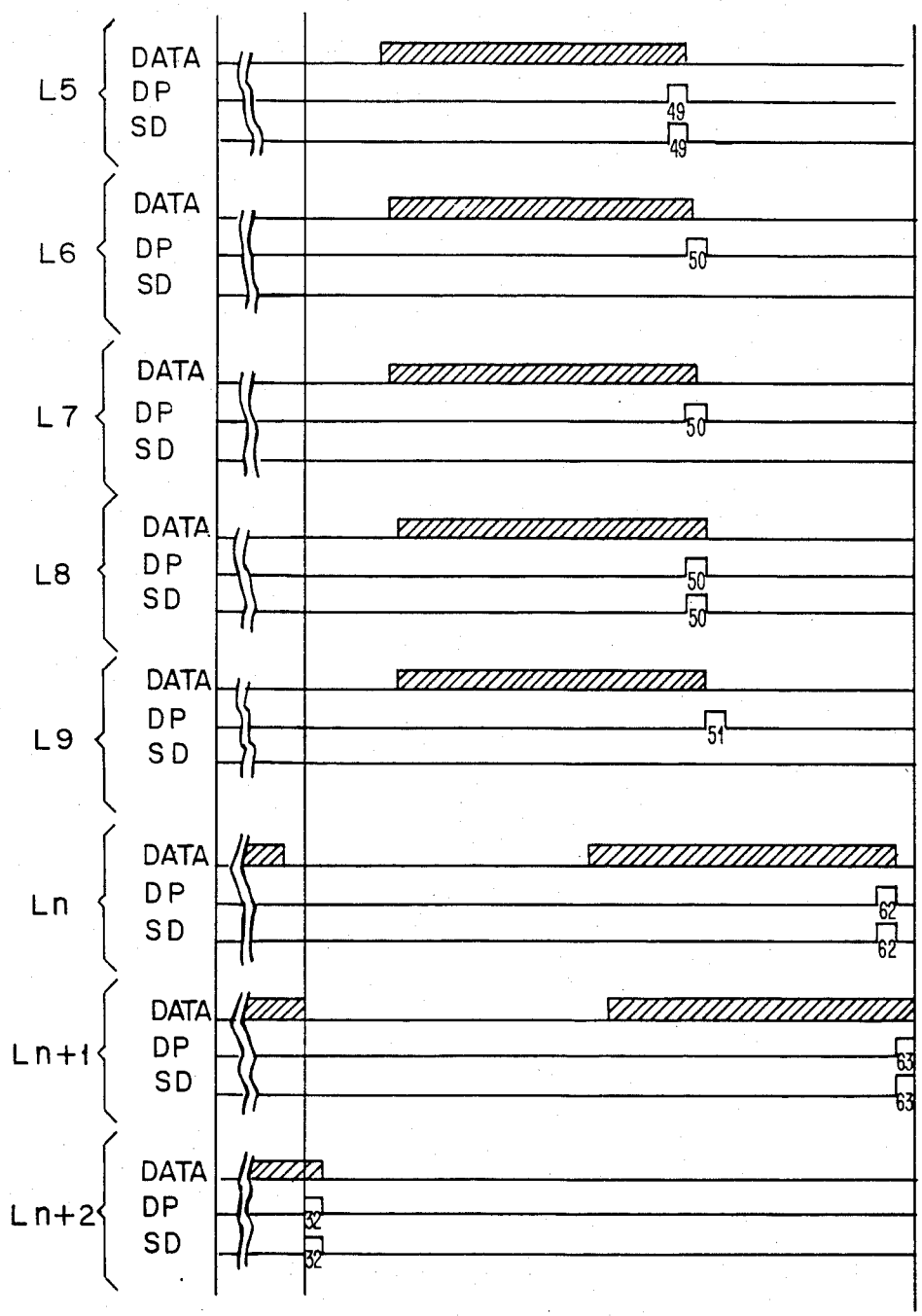

The output of threshold circuit 50 is applied to a gate circuit 53. The gate circuit 53 gates to a video data line data, representing #128-#2047 PELS on the document and the right margin area, in response to a valid video data line signal from the stripe analyze circuit 54. A control device, such as a (not shown) microprocessor unit (MPU), applies a "stripe sampling on" signal and an "initial scan line" signal to the stripe analyze circuit 54. The stripe sampling on signal determines when circuit 54 is active, and the initial scan line signal defines the time when the leading edge of the document is to be detected, as later described. When active, circuit 54 analyzes the #0 PEL data - #127 PEL data to determine when the document table 1 and document 4 have moved a predetermined distance relative to the scan system. Details of the stripe pattern and the analyze operation of circuit 54 are shown in FIGS. 6A and 6B. The stripe pattern 5 includes black stripes 5a and white stripes 5b. Boundaries between the black and white stripes are inclined at a 45 degree angle with respect to the main scan direction i.e. the direction of alignment of the 2048 CCD elements. As shown in FIGS. 4 and 6A, the stripe pattern has a left dummy area 41, a detection area 42 and a right dummy area 43. It is assumed that the resolution is 8 PEL/mm in the main scan direction and 8 PEL line/mm i.e. 8 scan line/mm, in the sub scan direction (the direction of document movement). Scan lines L1-Ln+2 indicate the movements of points viewed by the 2048 CCD elements in CCD unit 9, due to the movement of the document table relative to the scan system. The point viewed by each CCD element represents one PEL, such as PEL 32, PEL 33; each PEL having an area of ⅛ mm×⅛ mm.

Figure 10:
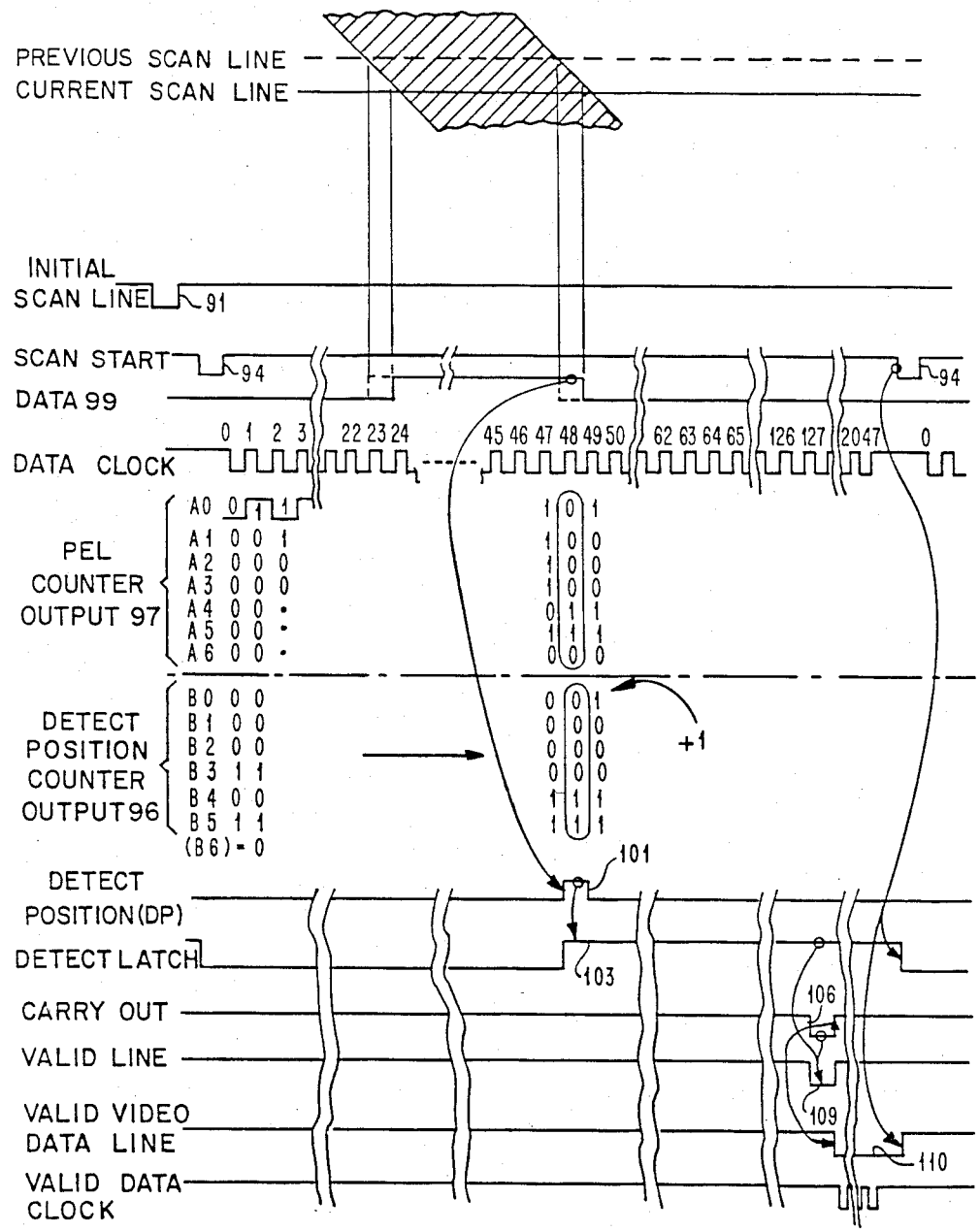
FIG. 10 shows pulse waveforms for explaining the operation of the stripe analyze circuit in FIG. 9.

The sampling operations of the 2048 CCD elements are periodically repeated under control scan start pulses indicated in FIG. 10. If the speed of document table 1 is maintained at a nominal feed speed synchronized with the sampling period of CCD unit 9, the scanned PEL lines repeat regularly at ⅛ mm intervals, as shown by the scan lines L1-L5 and Ln−1-Ln+2 in FIG. 6A. It is noted that lines L1 through Ln+2 indicate centers of respective PEL lines or scan lines. If the table speed becomes slower than the nominal feed speed, the PEL lines crowd together and may overlap as shown by lines L6-L10. It is noted that scan line L8 nominally has ⅛ mm spacing from scan line L5. Thus, it is desired to pick up line L8 as the next data line after L5, and to ignore lines L6 and L7 and lines L9 and L10. To scan document image lines at ⅛ mm intervals, stripe pattern 5 is inclined at 45 degrees to the main scan direction, and a detect position signal (DP) or detection window provided by stripe analyzer circuit 54 distinguishes ⅛ mm increments of displacement between document table and the scan system.

Figure 7:
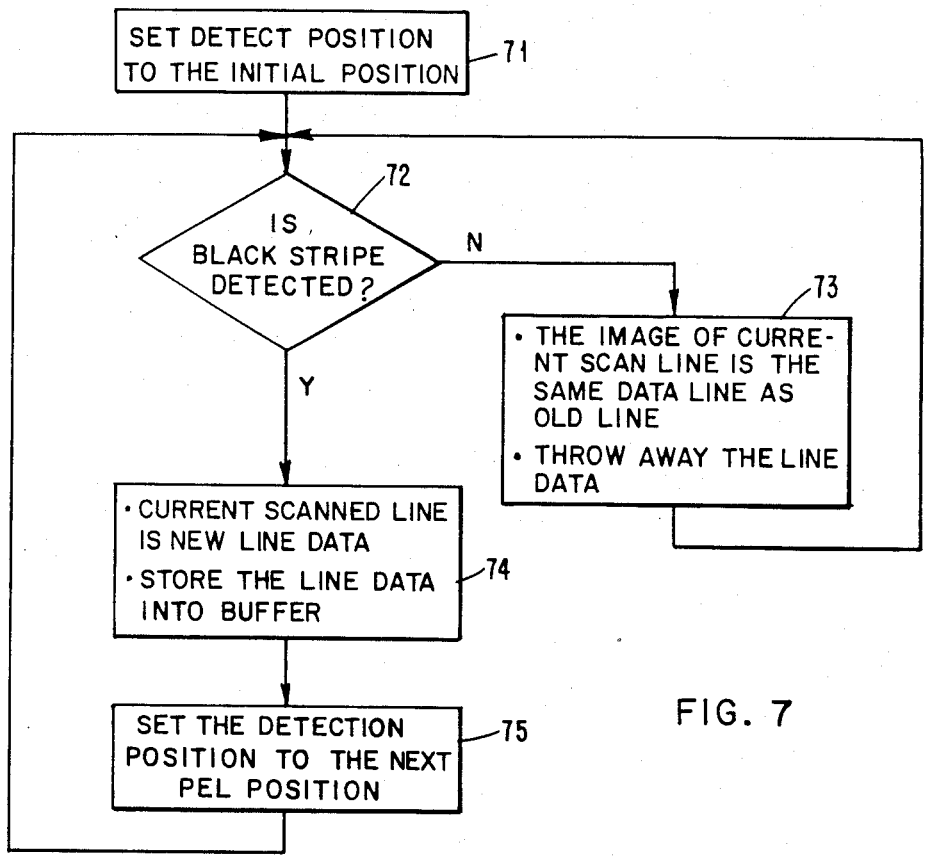
FIG. 7 is a flow chart explaining the operation according to the present invention of the system in FIGS. 6A and 6B.

The detect position is defined as a detection window of one PEL size. The initial position of the detect position (DP) could be located at any PEL position in the detection area. Assume that the position of this window is set initially at PEL position 48, as shown in FIG. 6A and block 71 of FIG. 7. The next operational step represented at block 72, FIG. 7, determines whether a black PEL or black stripe is detected in the detect position. Referring to FIG. 6A, scan lines L1, L2 and L3 do not have the black PEL in the detect position of PEL position 48. Therefore, block 72, FIG. 7, produces a negative (NO) output, and the image data on the document coinciding with scan lines L1, L2 and L3 is thrown away or ignored, so that the image data on these scan lines is not supplied to a buffer memory of image processing circuit as indicated at block 73 of FIG. 7. This "action loop", of blocks 72 and 73, is thereby repeated three times. At scan line L4, the detect position coincides with a black PEL/stripe; that is, PEL position 48 has a black value and a stripe detect pulse (SD) is produced, as indicated by YES output from block 72 in FIG. 7 to block 74. In block 74, the current scan line, i.e. line L4, is treated as a new scan line, and image data from this line is supplied to the buffer memory of the image processing circuit. This image data is gated by the valid video data line pulse (VVDL) as later described. The detection of the black stripe in detect position 48 shifts the detect position to the next right PEL position, i.e. PEL position 49, as indicated for line L5 in FIG. 6B and at block 75 in FIG. 7. This reverts operation to block 72 by which it is determined whether the black stripe on scan line L5 coincides with the detect position, i.e. PEL position 49. Since the answer is YES, a stripe detect pulse (SD) is generated and image data on the document at scan line L5 is supplied to the buffer memory, and the detect position is shifted to the next right PEL position 50, as shown by the detect position for line L6. This repeats operation 72 relative to scan line L6 and the new detect position, i.e. the PEL position 50.

Since the space between lines L5 and L6 is less than the nominal space ⅛ mm, due to a decrease of the speed of relative movement of the document—whereby the right edge of the black stripe has not reached the right end of the PEL position 50, that is, the black stripe is not found at the detect position—the valid line pulse is not produced. Therefore, the image data of the document on scan line L6 is not gated to the buffer memory, in accordance with operation 72, 73 of FIG. 7. Since the stripe detect pulse is not produced for scan line L6, the detect position does not advance to the next right PEL position and the operation of block 72 repeats for the next scan line L7. The scan line L7 has also not advanced to the ⅛ mm distance from the scan line L5, and the black stripe has not reached to the right end of the detect position, i.e. the PEL position 50, so that the stripe detect pulse (SD) is not produced, and the image data of the document on scan line L7 is not gated to the buffer memory. Therefore, the detect position again does not advance to the next right PEL position 51. For scan line L8, the black stripe coincides with the detect position, i.e. the PEL position 50, whereby the stripe detect pulse (SD) is produced, and the image data on the document at the position of scan line L8 is gated to the buffer memory. This shifts the detect position to the next right PEL position 51.

It is apparent that image data on the document at the positions of scan lines L6 and L7 are not gated to the buffer memory of the image processing circuit. The method of the present invention thereby follows changes in the speed of movement of the document table relative to the scan system (the line of sight of CCD unit 9), and precisely controls the gating of image data from the document to the buffer memory at intervals approaching the nominal spacing ⅛ mm. The detect position is shifted progressively to the right, and when it reaches the rightmost PEL position in the detection area 42, i.e. PEL position 63, the detect position returns to the leftmost PEL position, i.e. PEL position 32 in detection area 42. This operation is indicated by the pulses DP of the scan lines Ln, Ln+1 and Ln+2 in FIG. 6B.

Figure 8:
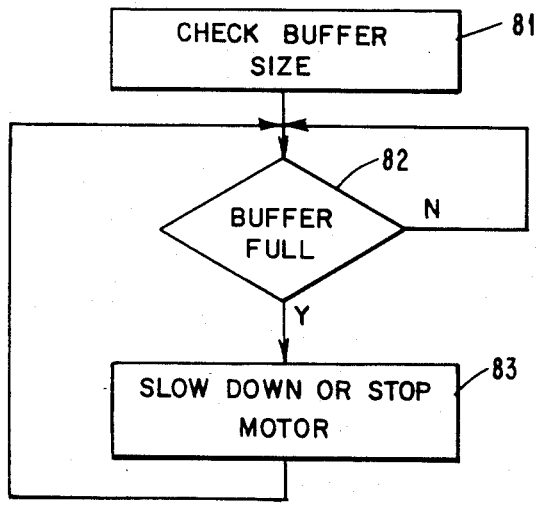
FIG. 8 is a flow chart explaining control of the relative speed of movement between a stripe pattern and CCD scan unit.

FIG. 8 shows that the speed of the relative movement of the document table to the CCD unit can be variably controlled in relation to the size of the unfilled space in the buffer memory of the image processing circuit. Thus, a buffer memory of small capacity, such as 128K bytes, could be used for processing a full page of data represented by 512K bytes. The speed of the driving motor of the moving document table is decreased as the buffer memory is being filled. And, the motor speed is increased to the nominal relative rate of movement when a large open area in the buffer memory is detected. The motor control routine, including blocks 81, 82 and 83 in FIG. 8, indicates this operation.

Figure 9:
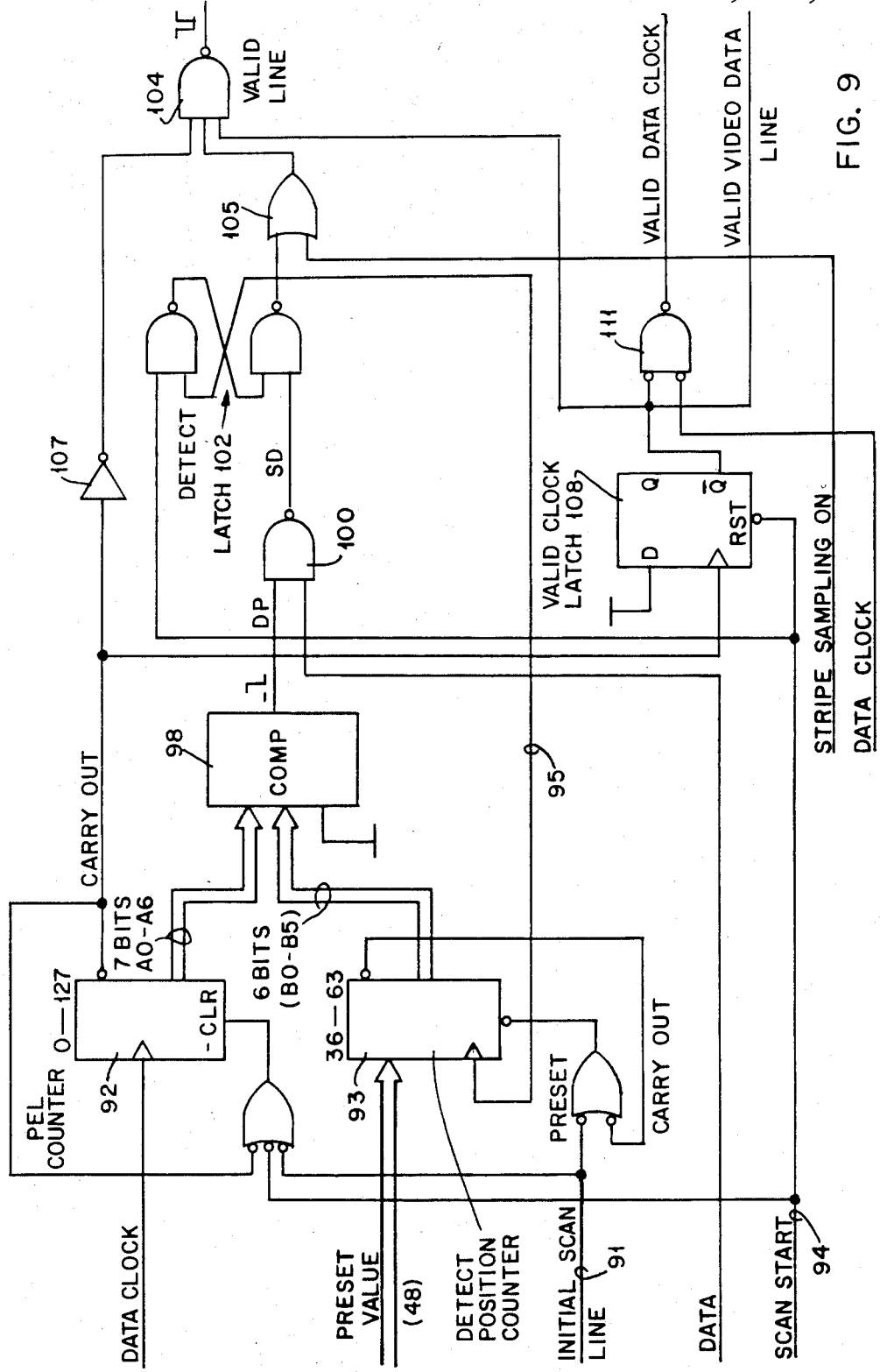
FIG. 9 is a detailed circuit diagram of a stripe analyze circuit as shown in FIG. 5.

FIG. 9 shows a detailed circuit configuration for the stripe analyze circuit 54. FIG. 10 shows a timing chart of pulses applied to and generated from the circuit 54.

At detection of the leading edge of the document 1, control unit generates an initial scan line pulse (ISL) on line 91 to reset PEL counter 92 and detect position counter 93. Then, timing generator 51, FIG. 5, periodically generates scan start pulses 94. Each scan start pulse 94 triggers a set of data clock pulses 0 through 2047, which are applied to the CCD unit 9 for sequentially sampling the CCD elements 0 through 2047. The detect position counter 93 specifies the position of the detect position. Initial value "48" is set to the counter 93. It is noted that any PEL position in the detection area is selected as the initial value of the detect position. The value "48" corresponds to the initial PEL position of the detect position or window shown in FIG. 6A.

The detect position counter 93 cycles through a range of values 32–63, in response to pulses on line 95, and generates a bit pattern 96, i.e. bits B0–B5, in FIG. 10, which represents the detect position. PEL counter 92, FIG. 9, generates bit pattern 97, i.e. bits A0–A6 in FIG. 10, in response to the data clock. For example, PEL counter 92 generates the bit pattern 0000011 in response to the application of the third data clock in the data clock train. Both bit patterns from the PEL counter 92 and the detect position counter 93 are compared by a comparator 98, which produces a pulse on its output when the bit patterns are equal. That is, the comparator 98 produces the pulse 101 when the sequentially sampled PEL position or the CCD element reaches the detection point. The data signal, i.e. "1" for a black stripe and "0" for a white stripe, of the sequentially sampled PEL position is applied to NAND gate 100. When a black PEL coincides with the detect position, NAND gate 100 produces a pulse 103. Pulse 103 increments detect position counter 93 to shift the current value "48" to the next value "49". This operation occurs for scan lines L4 and L5. For example, a black stripe on scan line L4 is detected at the detect position of PEL position 48, and the detect position is shifted to the next PEL position 49.

The up level of detect latch pulse 103 is applied as a first conditional input to NAND gate 104 through OR gate 105.

As data clock pulses are applied to the PEL counter 92, the count value represented by the bit pattern A0–A6 progressively approaches a value of 127, which represents the right edge of the pattern area 43 shown in FIG. 4. When value in counter 92 reaches 127, the counter produces a carry out pulse 106 (FIG. 10). The carry out pulse 106 is inverted by inverter 107 (FIG. 9) and the inverted up level pulse is applied to NAND gate 104, so that a second condition of this NAND gate is satisfied.

The carry out pulse 106 is also applied to a valid clock latch 108. Latch 108 generates a down level pulse in response to the positive going edge of the carry out pulse 106. Until the positive going edge, the output of the valid clock latch 108 is maintained at an up level, applied to NAND gate 104, so that a third condition of NAND gate is satisfied. That is, all of the first, second and third inputs of NAND gate 104 are at the up level when the carry out signal is at the down level, so that NAND gate 104 generates a down level valid line output pulse 109 indicating that image data of PEL positions 127 through 2047 should be supplied to the buffer memory of the image processing circuit. The negative going edge of the valid clock latch pulse 110 is also applied to a negative logic AND gate 111, and gates valid data clocks 127 through 2047, to sample image data signals from the document into buffer memory at the application of the data clock to the other input of gate 111.

It should now be apparent that the present stripe analyze circuit 54 (a) determines, for each scan (or PEL) line, whether the right edge of a black stripe is at the detect position (window); (b) when this condition is satisfied, allows image data of the respective line to be gated to the buffer memory of the image process circuit and the detect position is shifted to the next right PEL position; and (c) when this condition is not satisfied, causes respective image data to be discarded (not supplied to the buffer memory) and the detect position to remain not shifted.

ADVANTAGEOUS EFFECT OF THE INVENTION

The invention thereby realizes precise and virtually continuous image capture, regardless of the speed of relative movement between the document and the scan system, and permits simpler use of buffer memory with capacity smaller than the number of PEL bits in the full image (since the relative motion can be stopped and restarted without added reciprocal movement).

I claim:

1. In a document scanner for converting images on documents into corresponding electronically stored data signals—which operates by optically scanning a document along a line oriented in a first direction, converting images of scanned points along said line into corresponding electrical signals, storing representations of the electrical signals in a buffer store, and providing relative motion between the document and the scanning apparatus in a second direction perpendicular to said first direction to effect scanning of the document in said second direction by repeated scannings in said first direction in coordination with said motion—the improvement comprising:

means separate from the document to be scanned providing a pattern of optically scannable reference lines inclined in a direction oblique to both said first and second directions;

means for optically scanning said pattern in a direction parallel to said first direction;

means providing relative motion in said second direction between said pattern and said pattern scanning means, in coordination with the relative motion between said document and said document scanning apparatus;

a buffer store;

means coupled to said pattern scanning means for detecting discrete increments of displacement of said pattern relative to said first direction corresponding to pel increments of displacement of said document in said second direction; and means coupled to said displacement detecting means, said document scanning apparatus and said buffer store, for transferring samples of said electrical signals from said document scanning apparatus to said buffer store in conjunction with detections of successive discrete increments of displacement by said detecting means; whereby an image on a document may be effectively scanned in said second direction in uniform increments of displacement regardless of variations in and/or interruptions of the relative motion between the document and the document scanning apparatus.

2. In a document image scanner for converting images on a document into electronically stored data signals—which includes a table for holding a document to be scanned, an electro-optic scanning assembly for repeatedly scanning optically along a line extending in a first direction across the held document, and for producing electrical signals corresponding to optical point images sensed during each scan, means for displacing said table relative to said scanning assembly in a second direction perpendicular to said first direction, a buffer store, and means for transferring electrical signals between said scanning assembly and said store in coordination with motion of said assembly in said second direction whereby a continuous area on said document is effectively scanned and electrical signals corresponding to an optical image contained in said area are stored—the improvement comprising:

means separate from documents to be scanned and optically coupled to said scanning assembly for defining increments of displacement of said document in said second direction, said means comprising a pattern of optically sensable reference lines inclined in a direction oblique to said first and second directions;

means electrically coupled to said scanning assembly for receiving electrical signals corresponding to points of intersection between said reference lines and said line extending in said first direction;

means providing relative motion between said pattern and said scanning assembly in said second direction in coordination with displacements of said table relative to said assembly;

a buffer store;

means coupled to said electrical signal receiving means for detecting discrete increments of displacement of said pattern relative to said first direction corresponding to pel increments of relative displacement of said document in said second direction; and means coupled to said displacement detecting means, said scanning assembly and said buffer store, for transferring electrical signals representing image points on said document from said scanning apparatus to said buffer store in response to detections of successive discrete increments of displacement by said detecting means; whereby the document is effectively scanned in uniform discrete increments of displacement in said second direction regardless of variations in a speed of relative motion between said table and assembly and/or interruptions and resumptions of said motion.

3. A document image scanner in accordance with claim 2 wherein said oblique inclination of said lines in said pattern, relative to said first and second directions is selected to cause the intersection between any line in said pattern and the line along which scanning occurs in said first direction to shift by an amount corresponding to a smallest increment of pel resolution in said first direction when the document undergoes a corresponding increment of displacement in said second direction.

4. A document image scanner in accordance with claim 3 wherein said lines in said pattern are formed as alternating dark and light stripes of equal thickness.

5. A document scanner in accordance with claim 3 wherein said angle of inclination is 45 degrees.

6. A document scanner in accordance with claim 2 wherein said means for transferring signals to said buffer store operates between detections of successive increments of displacement to effectively suppress or discard image signals sensed by said scanning assembly.

7. A scanner in accordance with claim 2 wherein said table is movable in said second direction and the scanning assembly is stationary, and wherein said pattern is formed on a surface of said table bordering an area reserved for holding documents.

8. A scanner in accordance with claim 2 wherein said table and scanning assembly are both stationary, and said document are displaced relative to a surface of said table by means of a feed roll assembly; and wherein said displacement defining means consists of a roller element linked to said feed roll and containing said pattern on a revolving surface thereof which is optically linked to said scanning assembly.

9. A scanner in accordance with claim 2 wherein said table is stationary and said scanning assembly is movable in said second direction, and wherein said displacement defining means consists of a roller element linked to said scanning assembly for rotation in coordination with said scanning assembly, said element containing said pattern on a revolving surface thereof.

10. A method for converting optically scannable images on document media into corresponding data signals which can be stored and processed in an electronic data processing system comprising:

electro-optically scanning line portions of said media repeatedly in a first line direction with a predetermined pel resolution of displacement between successively scanned spots within each said portion to produce electrical signals;

limiting the width of each scanned line portion to the width of a single pel as determined by said perdetermined pel resolution;

displacing said media in a second direction perpendicular to said first direction;

detecting discrete increments of relative displacement of said media in said second direction corresponding to said pel resolution displacement in said first direction; and sampling electrical signals formed by said scanning operation exclusively in response to said increment detecting step, said signals representing images of spots on said media; whereby said sampled signals form a uniform representation of two-dimensional images on said media regardless of variations in the speed of said relative displacement of said media in said second direction and/or interruptions of the movement associated with said displacement.

11. The document scanning method of claim 10 wherein said step of detecting discrete increments of displacement is accomplished by:

scanning a pattern of reference lines separate from said document media in said first direction; said lines slanted at a predetermined oblique angle relative to said first direction;

relatively displacing said pattern in said second direction in coordination with said relative displacement of said document media in said second direction; and detecting when the intersection between a line in said pattern and the line along which said media is being scanned in said first direction has shifted in said first direction by an amount of displacement corresponding to said pel resolution.

* * * * *